US012664703B2

(12) United States Patent
Desai et al.

(10) Patent No.: US 12,664,703 B2
(45) Date of Patent: Jun. 23, 2026

(54) SYNCHRONIZING IMAGE SIGNAL PROCESSOR AND IMAGE SENSOR CONFIGURATIONS

(71) Applicant: QUALCOMM Incorporated, San Diego, CA (US)

(72) Inventors: Rohan Desai, San Diego, CA (US); King Wayne Luk, San Diego, CA (US); Rajakumar Govindaram, San Diego, CA (US); Satish Goverdhan, San Diego, CA (US); Chih-Heng Tzang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 18/435,780

(22) Filed: Feb. 7, 2024

(65) Prior Publication Data

US 2025/0252628 A1 Aug. 7, 2025

(51) Int. Cl.
*G06T 11/60* (2026.01)

(52) U.S. Cl.
CPC .................................... *G06T 11/60* (2013.01)

(58) Field of Classification Search
CPC ...................................................... G06T 11/60
USPC ........................................................ 345/619
See application file for complete search history.

(56) References Cited

U.S. PATENT DOCUMENTS

| | | | | |
|---|---|---|---|---|
| 12,109,714 B1 * | 10/2024 | Gao | ....................... | B25J 9/1697 |
| 12,380,701 B2 * | 8/2025 | Yadav | .................... | G06V 10/96 |
| 2020/0322530 A1 * | 10/2020 | Choi | ...................... | G06V 10/10 |
| 2023/0237796 A1 * | 7/2023 | Misic | .................... | G06V 10/24 |
| | | | | 345/619 |
| 2023/0245345 A1 * | 8/2023 | Peuhkurinen | ............. | G06T 7/73 |
| | | | | 382/155 |
| 2023/0316577 A1 * | 10/2023 | Ollila | ....................... | G06T 7/80 |
| | | | | 345/619 |
| 2024/0153141 A1 * | 5/2024 | Qiu | ........................ | H04N 25/71 |
| 2024/0221282 A1 * | 7/2024 | Takahashi | ............... | G06T 15/10 |
| 2024/0282092 A1 * | 8/2024 | Jayaraman | ....... | G06V 30/19173 |
| 2024/0311990 A1 * | 9/2024 | Rotzinger | .......... | G05B 19/0428 |

* cited by examiner

*Primary Examiner* — David T Welch
(74) *Attorney, Agent, or Firm* — NORTON ROSE FULBRIGHT US LLP

(57) ABSTRACT

This disclosure provides systems, methods, and devices for image signal processing that support synchronizing configurations between an image sensor and an image signal processor (ISP). In a first aspect, a method of image processing includes, for each stage of an ISP pipeline, configuring processing in the stage based on metadata in the image data from the image sensor. For example, a capture configuration identifier associated with an image frame may be used to reconfigure the ISP stage, such that the ISP stage configuration is updated in synchronization with image data received from an image sensor that has changed configurations. Other aspects and features are also claimed and described.

17 Claims, 8 Drawing Sheets

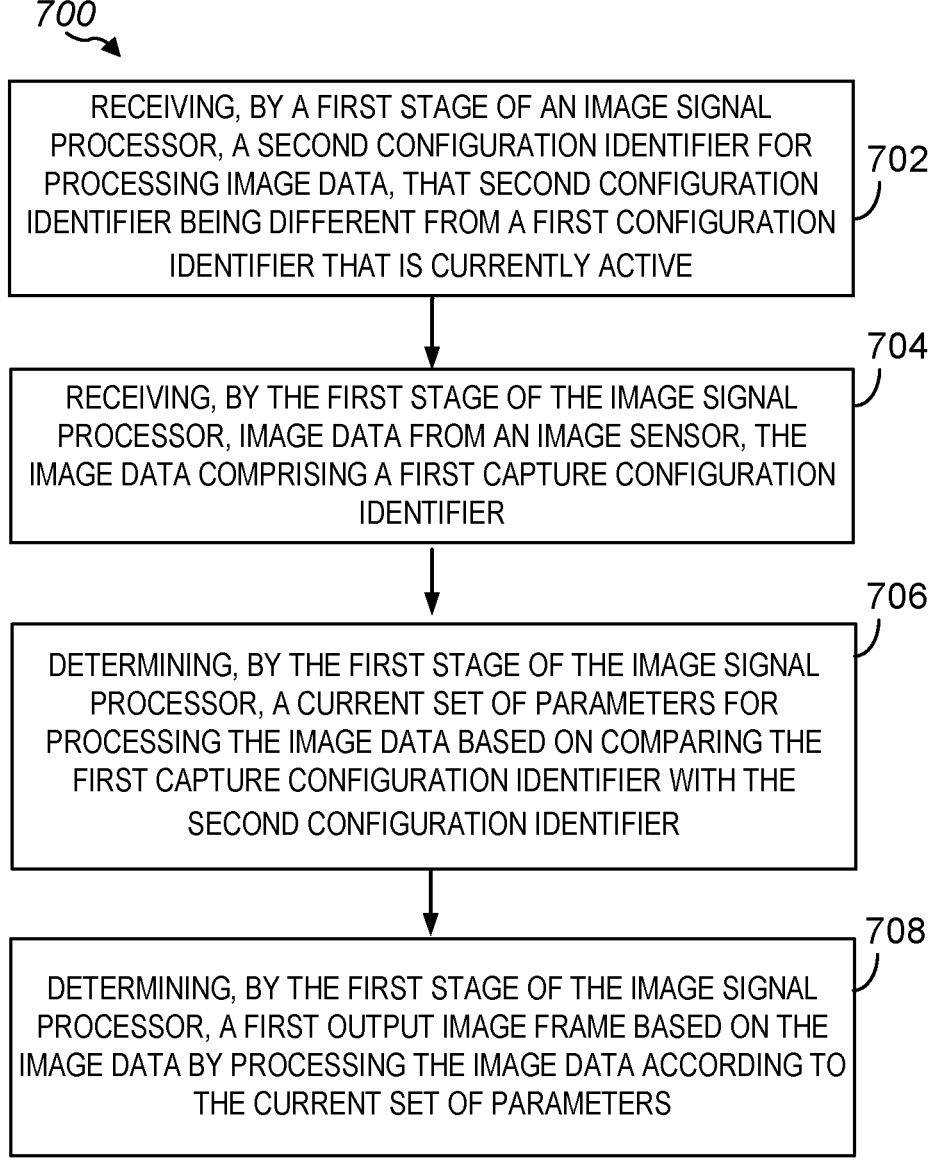

700

RECEIVING, BY A FIRST STAGE OF AN IMAGE SIGNAL
PROCESSOR, A SECOND CONFIGURATION IDENTIFIER FOR
PROCESSING IMAGE DATA, THAT SECOND CONFIGURATION
IDENTIFIER BEING DIFFERENT FROM A FIRST CONFIGURATION
IDENTIFIER THAT IS CURRENTLY ACTIVE

702

RECEIVING, BY THE FIRST STAGE OF THE IMAGE SIGNAL
PROCESSOR, IMAGE DATA FROM AN IMAGE SENSOR, THE
IMAGE DATA COMPRISING A FIRST CAPTURE CONFIGURATION
IDENTIFIER

704

DETERMINING, BY THE FIRST STAGE OF THE IMAGE SIGNAL
PROCESSOR, A CURRENT SET OF PARAMETERS FOR
PROCESSING THE IMAGE DATA BASED ON COMPARING THE
FIRST CAPTURE CONFIGURATION IDENTIFIER WITH THE
SECOND CONFIGURATION IDENTIFIER

706

DETERMINING, BY THE FIRST STAGE OF THE IMAGE SIGNAL
PROCESSOR, A FIRST OUTPUT IMAGE FRAME BASED ON THE
IMAGE DATA BY PROCESSING THE IMAGE DATA ACCORDING TO
THE CURRENT SET OF PARAMETERS

SYNCHRONIZING IMAGE SIGNAL PROCESSOR AND IMAGE SENSOR CONFIGURATIONS

TECHNICAL FIELD

Aspects of the present disclosure relate generally to image processing, and more particularly, to processing data received from an image sensor. Some features may enable and provide improved image processing, including improved image capture performance.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The increasing amount of image data captured by the image capture device has some negative effects that accompany the increasing resolution obtained by the additional image data. Additional image data increases the amount of processing performed by the image capture device in determining image frames and videos from the image data, as well as in performing other operations related to the image data. For example, the image data may be processed through several processing blocks for enhancing the image before the image data is displayed to a user on a display or transmitted to a recipient in a message.

Image capture devices may include components that capture image data, such as image sensors, and components that process image data, such as image signal processors. These two components operate together to determine output images such as to be saved as files or output to a preview display. Settings on the image sensor for capturing image data affect how the image data should be processed by the image signal processor. Changes to settings on the image sensor are thus accompanied by corresponding changes to settings on the image signal processor. However, synchronizing changes on the image sensor and the image signal processor can be difficult and any timing error between the configuration changes can result in reduced image quality of image frames and/or lost image frames.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, synchronization of settings between the image signal processor and the image sensor may be provided by passing a capture configuration identifier as part of the image data processed by the image signal processor. As the image data propagates through one or more stages of the image signal processor, the various stages update their configuration based on the capture configuration identifier in the image data. This allows the image signal processing pipeline to reconfigure at the appropriate time for processing the image data.

The image sensor may include a capture configuration identifier with pixel data captured by the sensor, such as by incorporating the capture configuration identifier into a frame header. The image signal processor may include logic to check the incoming image data against a configuration identifier for the ISP stage. The ISP stage may update to the configuration if the capture configuration identifier matches the configuration identifier, otherwise the ISP stage continue to process pixel data using a previous configuration.

In one aspect of the disclosure, a method for image processing includes receiving, by a first stage of an image signal processor, a second configuration identifier for processing image data, that second configuration identifier being different from a first configuration identifier that is currently active; receiving, by the first stage of the image signal processor, image data comprising a first capture configuration identifier; determining, by the first stage of the image signal processor, a current set of parameters for processing the image data based on comparing the first capture configuration identifier with the second configuration identifier; and determining, by the first stage of the image signal processor, a first output image frame based on the image data by processing the image data according to the current set of parameters.

In an additional aspect of the disclosure, an apparatus includes at least one processor and a memory coupled to the at least one processor. The at least one processor is configured to perform operations including receiving, by a first stage of an image signal processor, a second configuration identifier for processing image data, that second configuration identifier being different from a first configuration identifier that is currently active; receiving, by the first stage of the image signal processor, image data comprising a first capture configuration identifier; determining, by the first stage of the image signal processor, a current set of parameters for processing the image data based on comparing the first capture configuration identifier with the second configuration identifier; and determining, by the first stage of the image signal processor, a first output image frame based on the image data by processing the image data according to the current set of parameters.

In an additional aspect of the disclosure, an apparatus includes means for receiving, by a first stage of an image signal processor, a second configuration identifier for processing image data, that second configuration identifier being different from a first configuration identifier that is currently active; means for receiving, by the first stage of the image signal processor, image data comprising a first capture configuration identifier; means for determining, by the first stage of the image signal processor, a current set of parameters for processing the image data based on comparing the first capture configuration identifier with the second configuration identifier; and means for determining, by the first stage of the image signal processor, a first output image frame based on the image data by processing the image data according to the current set of parameters.

In a further aspect of the disclosure, an image capture device includes an image sensor, a memory, and at least one image signal processor coupled to the memory and to the image sensor, the at least one image signal processor configured to perform steps including receiving, by a first stage of an image signal processor, a second configuration identifier for processing image data, that second configuration identifier being different from a first configuration identifier that is currently active; receiving, by the first stage of the image signal processor, image data comprising a first capture configuration identifier; determining, by the first stage of the image signal processor, a current set of parameters for processing the image data based on comparing the first capture configuration identifier with the second configuration identifier; and determining, by the first stage of the image signal processor, a first output image frame based on the image data by processing the image data according to the current set of parameters.

In an additional aspect of the disclosure, a non-transitory computer-readable medium stores instructions that, when executed by a processor, cause the processor to perform operations. The operations include receiving, by a first stage of an image signal processor, a second configuration identifier for processing image data, that second configuration identifier being different from a first configuration identifier that is currently active; receiving, by the first stage of the image signal processor, image data comprising a first capture configuration identifier; determining, by the first stage of the image signal processor, a current set of parameters for processing the image data based on comparing the first capture configuration identifier with the second configuration identifier; and determining, by the first stage of the image signal processor, a first output image frame based on the image data by processing the image data according to the current set of parameters.

Methods of image processing described herein may be performed by an image capture device and/or performed on image data captured by one or more image capture devices. Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multiframe noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow chart illustrating a method of reconfiguring an image signal processor (ISP) stage according to some embodiments of the disclosure.

Like reference numbers and designations in the various drawings indicate like elements.

DETAILED DESCRIPTION

Figure 1:
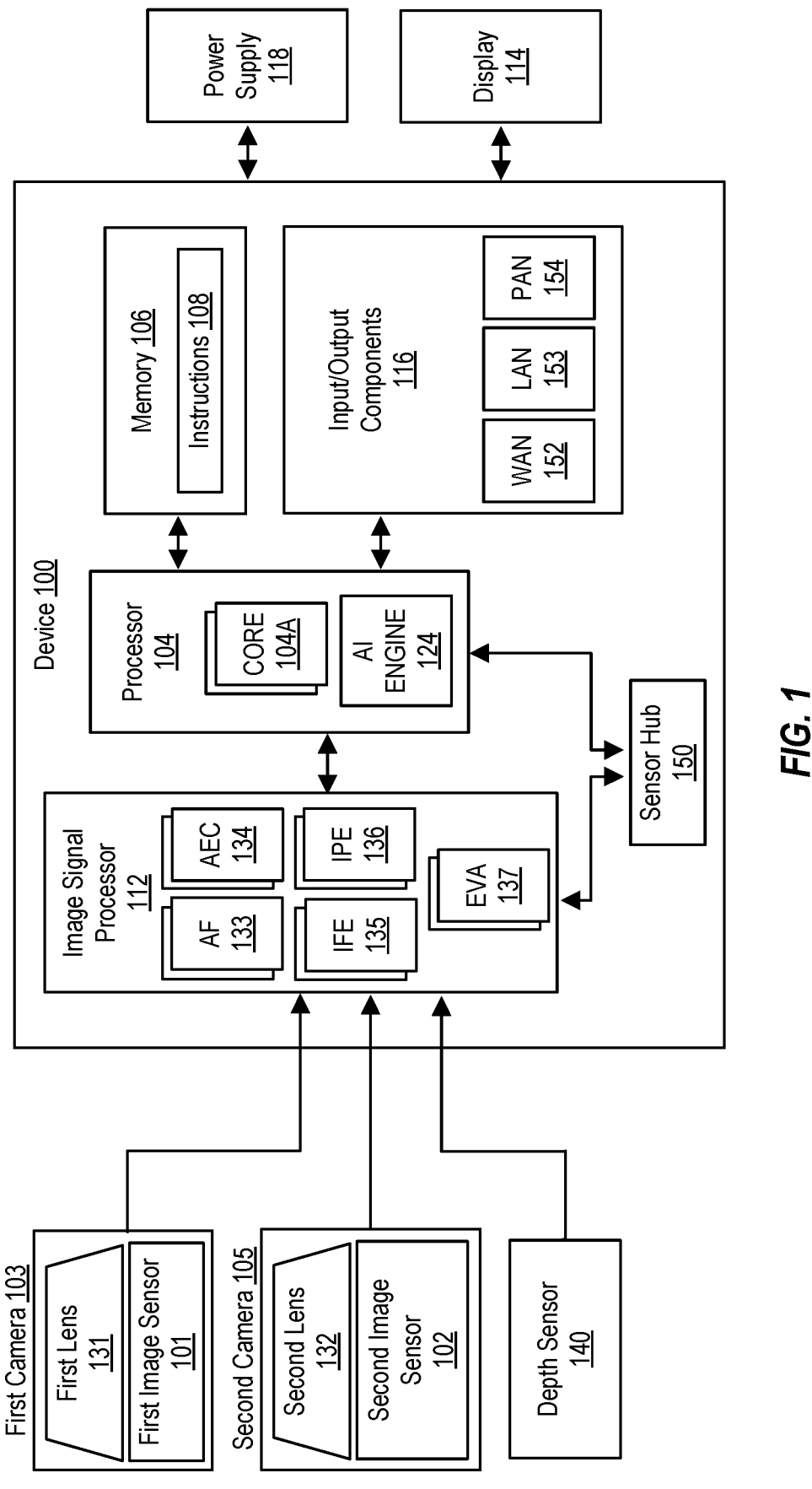
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for configuring an image signal processor with one or more stages in a pipeline by using metadata, such as a capture configuration identifier, to configure the ISP pipeline as the stages receive and process data. The configuration techniques may allow the ISP to reconfigure synchronously with configuration changes to the image sensor.

Particular implementations of the subject matter described in this disclosure may be implemented to realize one or more of the following potential advantages or benefits. In some aspects, the present disclosure provides techniques for processing image data with reduced latency, reduced frame drop, and/or improved image quality. The synchronization of configurations between the image sensor and the image signal processor may also provide tight coupling of 2 A settings (e.g., auto white balance (AWB) and autoexposure (AE)) in synchronization with sensor configuration, reduced software workload, improved coupling between image sensor and ISP configuration, and/or offloading application processor (AP) workload used to manage configuration of the image sensor and image signal processor. Further, this may be beneficial in situations involving safety, such as when processing images as part of a vehicular guidance system where dropped image frames may delay the ability of the vehicle to react to dangerous situations.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some embodiments, the camera module may include one or more components including the image sensor included in a single package with an interface configured to couple the camera module to an image signal processor or other processor through a bus.

FIG. 1 shows a block diagram of a device 100 for performing image capture from one or more image sensors. The device 100 may include, or otherwise be coupled to, an image signal processor (e.g., ISP 112) for processing image frames from one or more image sensors, such as a first image sensor 101, a second image sensor 102, and a depth sensor 140. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some embodiments, antennas may be shared for communicating on different networks by the WAN adaptor 152, LAN adaptor 153, and/or PAN adaptor 154. In some embodiments, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101 or second image sensor 102 and processing circuitry in the device 100. In some embodiments, AFEs may be embedded in the ISP 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112 and/or the processor 104.

The ISP 112 may receive captured image data. In one embodiment, a local bus connection couples the ISP 112 to the first image sensor 101 and second image sensor 102 of a first camera 103 and second camera 105, respectively. In another embodiment, a wire interface couples the ISP 112 to an external image sensor. In a further embodiment, a wireless interface couples the ISP 112 to the first image sensor 101 or second image sensor 102.

The first image sensor 101 and the second image sensor 102 are configured to capture image data representing a scene in the field of view of the first camera 103 and second camera 105, respectively. In some embodiments, the first camera 103 and/or second camera 105 output analog data, which is converted by an analog front end (AFE) and/or an analog-to-digital converter (ADC) in the device 100 or embedded in the ISP 112. In some embodiments, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated an autofocus (AF) algorithm (e.g., AF 133) executing in the ISP 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some embodiments, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

The ISP 112 processes image frames captured by the first camera 103 and second camera 105. While FIG. 1 illustrates the device 100 as including first camera 103 and second camera 105, any number (e.g., one, two, three, four, five, six, etc.) of cameras may be coupled to the ISP 112. In some aspects, depth sensors such as depth sensor 140 may be coupled to the ISP 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), light detection and ranging (Lidar), mm Wave, radio detection and ranging (Radar), and/or hybrid depth sensors, such as structured light sensors. In embodiments without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some embodiments, the ISP 112 may execute instructions from a memory, such as instructions 108 from the memory 106, instructions stored in a separate memory coupled to or included in the ISP 112, or instructions provided by the processor 104. In addition, or in the alternative, the ISP 112 may include specific hardware (such as one or more integrated circuits (ICs)) configured to perform one or more operations described in the present disclosure. For example, the ISP 112 may include image front ends (e.g., IFE 135), image post-processing engines (e.g., IPE 136), auto exposure compensation (AEC) engines (e.g., AEC 134), and/or one or more engines for video analytics (e.g., EVA 137), and/or other ISP pipeline stages. An image pipeline may be formed by a sequence of one or more of the IFE 135, IPE 136, and/or EVA 137. In some embodiments, the image pipeline may be reconfigurable in the ISP 112 by changing connections between the IFE 135, IPE 136, and/or EVA 137. The AF 133, AEC 134, IFE 135, IPE 136, and EVA 137 may each include application-specific circuitry, be embodied as software or firmware executed by the ISP 112, and/or a combination of hardware and software or firmware executing on the ISP 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In addition to instructions 108, the memory 106 may also store image frames. The image frames may be output image frames stored by the ISP 112. The output image frames may be accessed by the processor 104 for further operations. In some embodiments, the device 100 does not include the memory 106. For example, the device 100 may be a circuit including the ISP 112, and the memory may be outside the device 100. The device 100 may be coupled to an external memory and configured to access the memory for writing output image frames for display or long-term storage. In some embodiments, the device 100 is a system-on-chip (SoC) that incorporates the ISP 112, the processor 104, the sensor hub 150, the memory 106, and/or components 116 into a single package.

In some embodiments, at least one of the ISP 112 or the processor 104 executes instructions to perform various operations described herein, including reconfiguring stages of the image signal processor in accordance with image data processed by the image signal processor. For example, execution of the instructions can instruct the ISP 112 to begin or end capturing an image frame or a sequence of image frames, in which the capture includes correction as described in embodiments herein. In some embodiments, the processor 104 may include one or more general-purpose processor cores 104A-N capable of executing instructions to control operation of the ISP 112. For example, the cores 104A-N may execute a camera application (or other suitable application for generating images or video) stored in the memory 106 that activate or deactivate the ISP 112 for capturing image frames and/or control the ISP 112 in the application of image processing with matching configuration to the image frames. The operations of the cores 104A-N and ISP 112 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage. Image processing to determine "output" or "corrected" image frames, such as according to techniques described herein, may be applied to one or more image frames in the sequence.

In some embodiments, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other embodiments, the device 100 does not include the processor 104, such as when all of the described functionality is configured in the ISP 112.

In some embodiments, the display 114 may include one or more suitable displays or screens allowing for user interaction and/or to present items to the user, such as a preview of the output of the first camera 103 and/or second camera 105. In some embodiments, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the ISP 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the ISP 112 is illustrated as separate from the processor 104, the ISP 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by synchronizing configurations between the image sensor and the image signal processor. One example method of operating one or more cameras, such as first camera 103 and/or second camera 105, is shown in FIG. 2 and described below.

Figure 2:
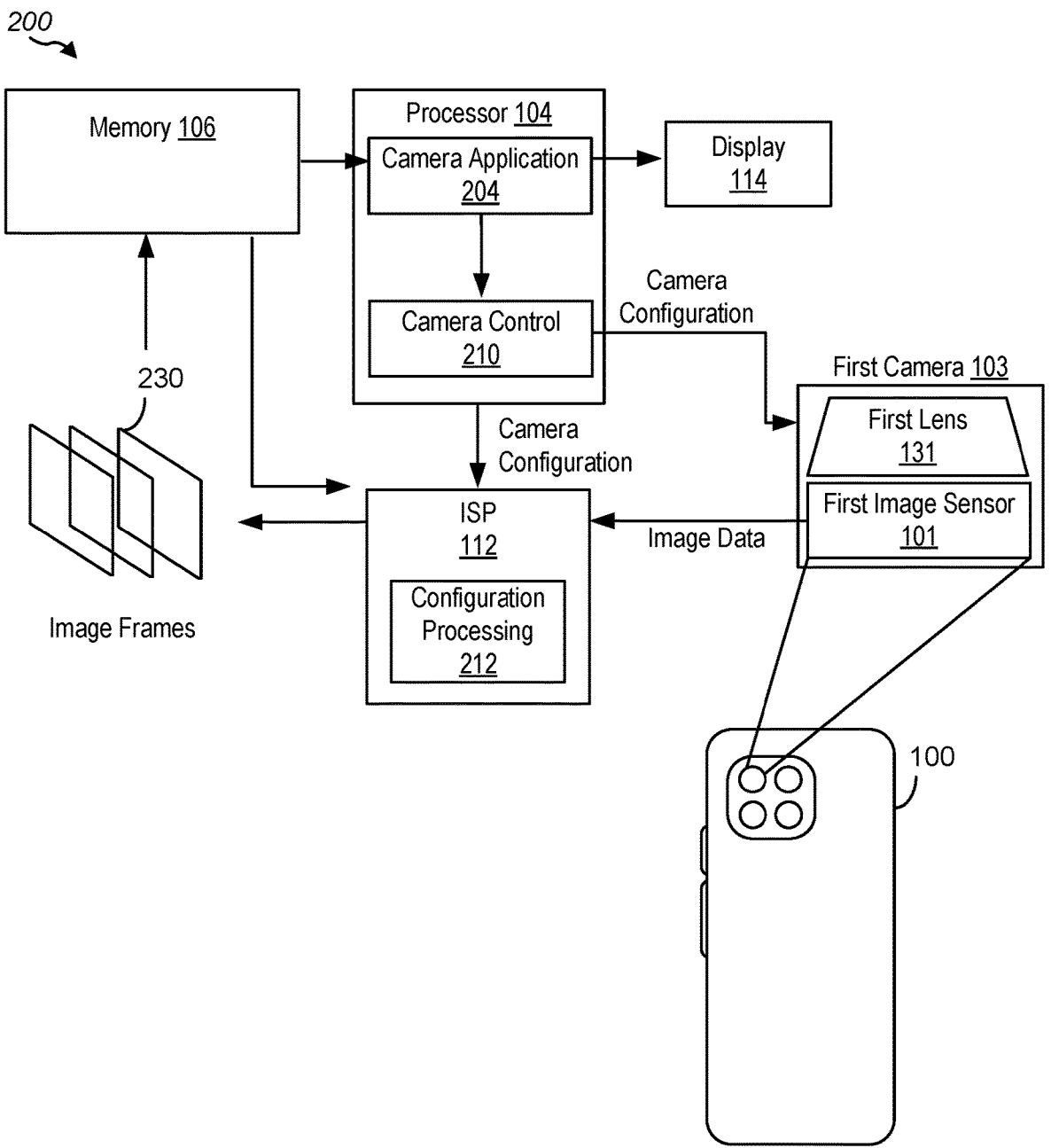
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosures. Processor 104 of system 200 may communicate with ISP 112 through a bi-directional bus and/or separate control and data lines. The processor 104 may control the first camera 103 through camera control 210. The camera control 210 may be a camera driver executed by the processor 104 for configuring the first camera 103, such as to active or deactivate image capture, configure exposure settings, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the first camera 103 to configure the first camera 103 in accordance with commands received from the camera application 204. The camera application 204 may be, for example, a photography application, a document scanning application, a messaging application, or other application that processes image data acquired from the first camera 103.

The camera configuration may include parameters that specify, for example, a frame rate, an image resolution, a readout duration, an exposure level, an aspect ratio, an aperture size, etc. The first camera 103 may apply the camera configuration and obtain image data representing a scene using the camera configuration. In some embodiments, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera

103, and to obtain second image data from the first camera 103 operating in the second camera configuration.

In some embodiments in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 may be processed in one or more blocks of the ISP 112 to determine output image frames 230 that may be stored in memory 106 and/or otherwise provided to the processor 104. The processor 104 may further process the image data to apply effects to the output image frames 230. Effects may include Bokeh, lighting, color casting, and/or high dynamic range (HDR) merging. In some embodiments, the effects may be applied in the ISP 112.

The output image frames 230 by the ISP 112 may include representations of the scene improved by aspects of this disclosure, such that the image data is processed by ISP stages configured to match the configuration of the image sensor capturing the image data. The processor 104 may display these output image frames 230 to a user, and the improvements provided by the described processing implemented in the ISP 112 and/or processor 104 improve the image quality and the user experience by reducing the appearance of bright and dark regions in the photograph. For example, configuration processing 212 in the ISP 112 may include logic for reconfiguring the ISP 112 based on a capture configuration identifier received from the image sensor. The ISP 112 may determine the output image frames 230.

Figure 3:
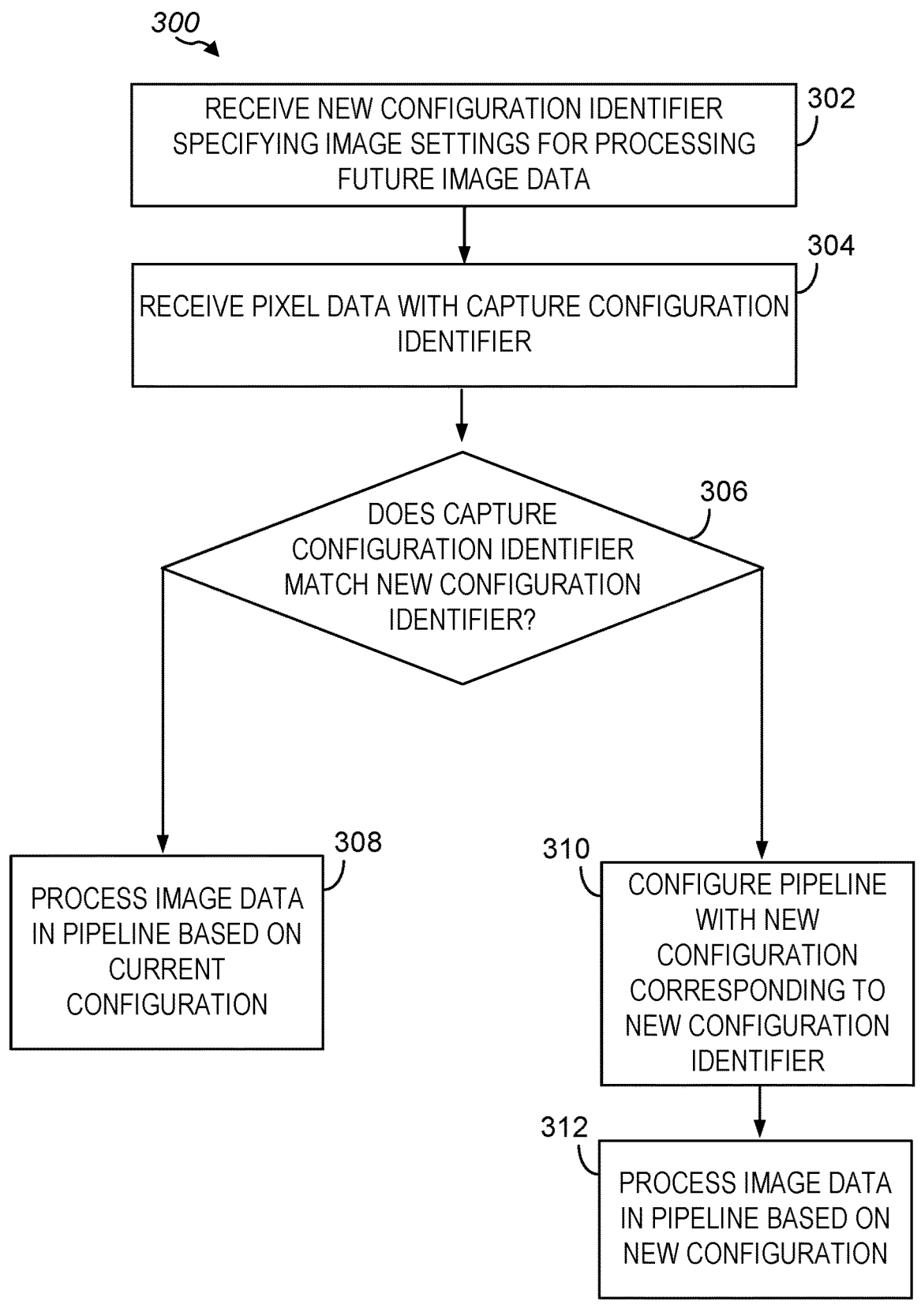
FIG. 3 shows a flow chart of an example method for processing image data to perform a configuration update according to some embodiments of the disclosure.

The system 200 of FIG. 2 may be configured to perform the operations described with reference to FIG. 3 to determine output image frames 230. FIG. 3 shows a flow chart of an example method for processing image data to perform a configuration update according to some embodiments of the disclosure. The capturing in FIG. 3 may obtain an improved digital representation of a scene, which results in a photograph or video with higher image quality (IQ). Each of the operations described with reference to FIG. 3 may be performed by one or a combination of the processor 104 (including cores 104A-N or AI engine 124) and/or the ISP 112.

At block 302, the ISP 112 or stages of the ISP 112 receives a new configuration identifier specifying image settings for processing future image data. The configuration identifier may include parameters such as 2 A settings for processing the image data. The configuration identifier may be programmed by the processor 104 or other control logic.

At block 304, image data is received from the image sensor, such as while the image sensor is configured with the camera configuration. The image data may include pixel data (e.g., intensity values corresponding to pixels in the image sensor array, each reflecting different colors) and a capture configuration identifier. The capture configuration identifier identifies the camera configuration that was used by the image sensor to obtain the pixel data, and thus the capture configuration identifier provides metadata about the pixel data that can be used by the ISP 112 when processing the pixel data. For example, the configuration identifier may specify one or more parameters that should be used when applying exposure correction during processing of the pixel data.

The first image data may be received, for example, from a bus coupled to the first camera 103 or from an analog front end (AFE) coupled to the first camera 103. The first image data may alternatively be received from a wireless camera, in which the image data is received through one or more of the WAN adaptor 152, the LAN adaptor 153, and/or the PAN adaptor 154. The first image data may alternatively be received from a memory location or a network storage location, such as when the image data was previously captured and is now retrieved from memory 106 and/or a remote location through one or more of the WAN adaptor 152, the LAN adaptor 153, and/or the PAN adaptor 154. In some embodiments, the capture of image data may be initiated by a camera application executing on the processor 104, which causes camera control 210 to activate capture of image data by the first camera 103. The image data retrieved at block 302 may be then processed by the ISP 112 and/or processor 104 or other means for processing image data according to the operations described in one or more of the following blocks.

At block 306, the capture configuration identifier (that was received with the pixel data as part of the image data) is compared with the new configuration identifier received at block 302. If the two identifiers match, the match is an indication that the image data was captured with the new configuration indicated by the new configuration identifier. If the two identifiers do not match, the mismatch is an indication that the image data was captured with a previous configuration, such that the image sensor has not switched to capture settings based on the new configuration. The processing of the pixel data is then performed based on whether the identifiers match or do not match.

If the identifiers at block 306 do not match, the processing of method 300 continues to block 308 to process image data in the image pipeline based on a current configuration.

If the identifiers at block 306 do match, the processing of method 300 continues to block 310 and block 312. At block 310, the pipeline or pipeline stage is configured with a new configuration corresponding to the new configuration identifier. At block 312, the image data is processed based on the new configuration of block 310.

The method 300 may be executed by an ISP to configure the entire ISP, or may be executed by individual stages of the ISP to configure each stage individually. When the method 300 is executed at each individual stage of a multi-stage ISP, the processing by each stage is updated with the new configuration as image data captured with the new configuration is passed through the ISP pipeline. The separate updating of pipeline stages in the ISP achieves a benefit of preventing image data from being processed in the different stages using a configuration that does not correspond to the image sensor configuration. That is, the configuration of individual stages is updated as the image data captured with a new configuration traverses the pipeline, rather than a reconfiguration of the entire pipeline that could corrupt image data already in the pipeline. The updating of configuration in individual stages as image data passes through the stages may reduce or eliminate image frames dropped during processing of the image data through the ISP pipeline. This may be particularly beneficial in situations involving safety, such as when processing images as part of a vehicular guidance system where dropped image frames may delay the ability of the vehicle to react to dangerous situations.

Figure 4:
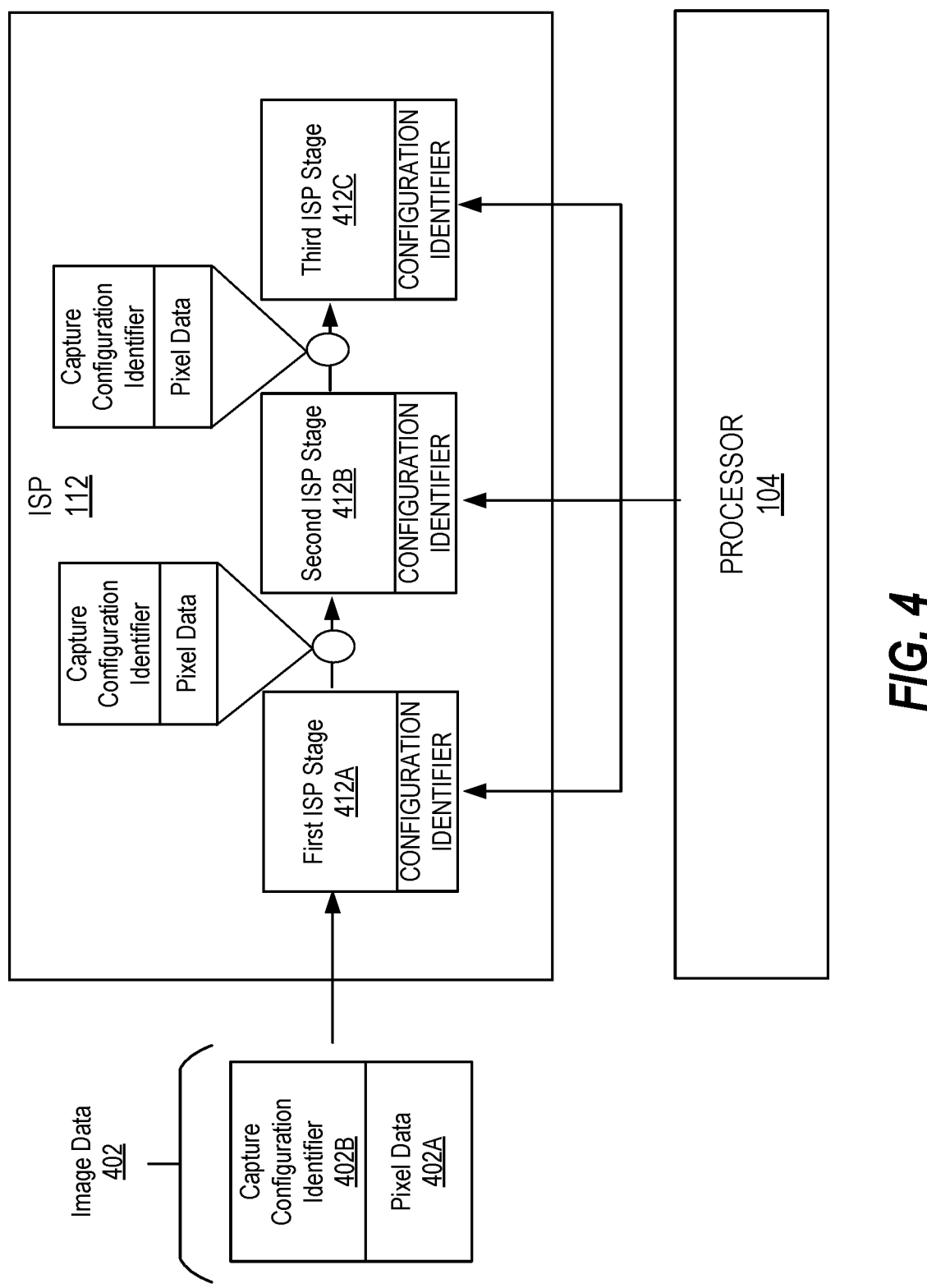
FIG. 4 is a block diagram illustrating processing of image data according to a capture configuration identifier in multiple stages of an image signal processor (ISP) according to some embodiments of the disclosure.

An example of an ISP pipeline with multiple stages that may be configured to update as image data traverses the pipeline is shown in FIG. 4. FIG. 4 is a block diagram illustrating processing of image data according to a capture configuration identifier in multiple stages of an image signal processor (ISP) according to some embodiments of the disclosure. Image data 402 includes a capture configuration identifier 402B and associated pixel data 402A. The pixel data 402A is captured by the image sensor configured according to parameters associated with the configuration identifier 402B. The ISP 112 may include one or more ISP stages 412A-C. Although three stages are shown, the ISP 112 may include one, two, four, or more stages. The image data 402 is input to the first ISP stage 412A.

Each ISP stage 412A-C is configured with a configuration identifier. The configuration identifier may be set by software executing on the processor 104, or other hardware or software logic within the device containing ISP 112. The configuration identifier for the ISP stages 412A-C specifies a future configuration for the ISP stages 412A-C. The processor 104, or other logic circuitry, may program the image sensor with a corresponding configuration identifier. When the image sensor switches to operating with the new configuration identifier, the capture configuration identifier 402B in the image data 402 will change to the new configuration identifier. When that new configuration identifier matches the new configuration identifier programmed for one of the ISP stages 412A-C that one of the ISP stages 412A-C switches to processing based on the new configuration.

In operation, this allows each ISP stage 412A-C to reconfigure based on the image data being processed. When image data 402 reflects a new configuration identifier at input to the first ISP stage 412A, the first ISP stage 412A switches to the new configuration for processing that image data. Other image data already in the pipeline at second ISP stage 412B and third ISP stage 412C continues to be processed at the previous configuration. When the image data is output from first ISP stage 412A to the second ISP stage 412B, the second ISP stage 412B processes the capture configuration identifier and reconfigures to match the new configuration. Other image data already in the pipeline at third ISP stage 412C continues to be processed at the previous configuration. New image data input to the first ISP stage 412A may continue to be processed at the new configuration or reconfigured to a newer configuration identifier. When the image data is output from second ISP stage 412B to the third ISP stage 412C, the third ISP stage 412C processes the capture configuration identifier and reconfigures to match the new configuration. In this manner, the new configuration cascades through the stages of the ISP 112 such that image data is not processed using different configurations within the ISP 112, which could cause a decrease in image quality.

Figure 5A:
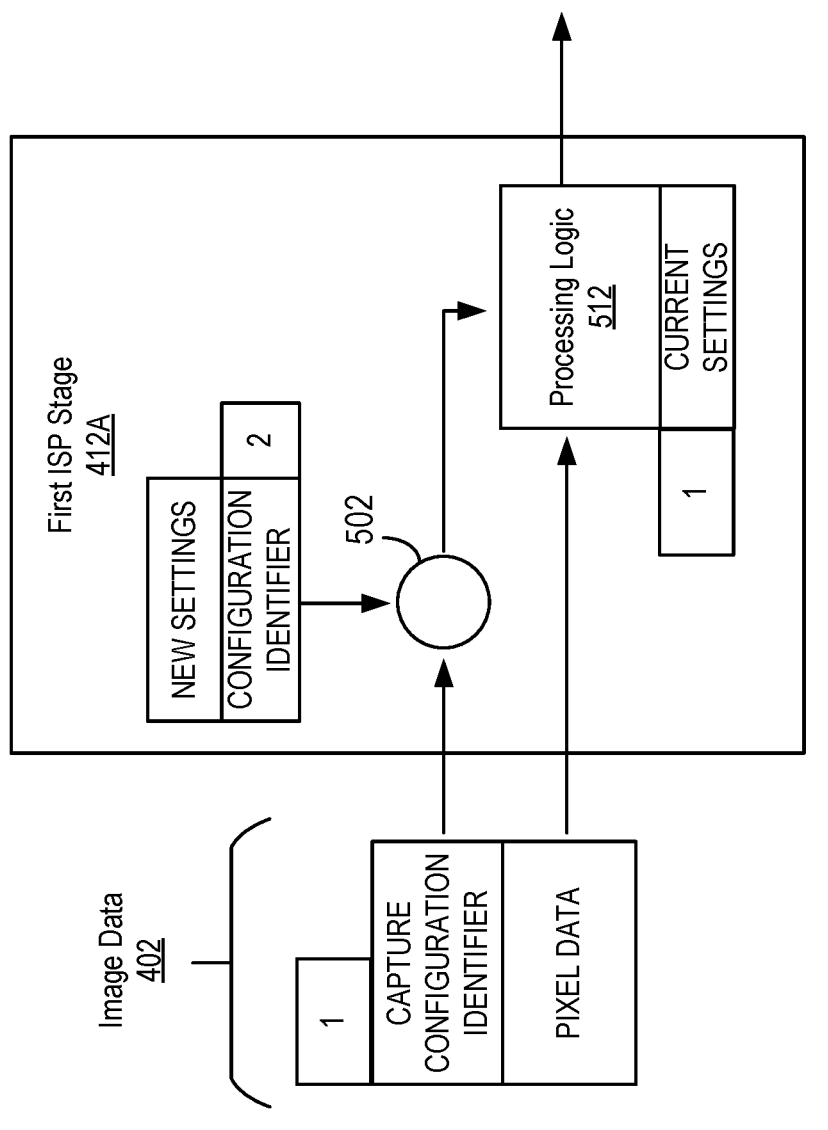
FIG. 5A is a block diagram of an image signal processor (ISP) stage in a first configuration according to some embodiments of the disclosure.
Figure 5B:
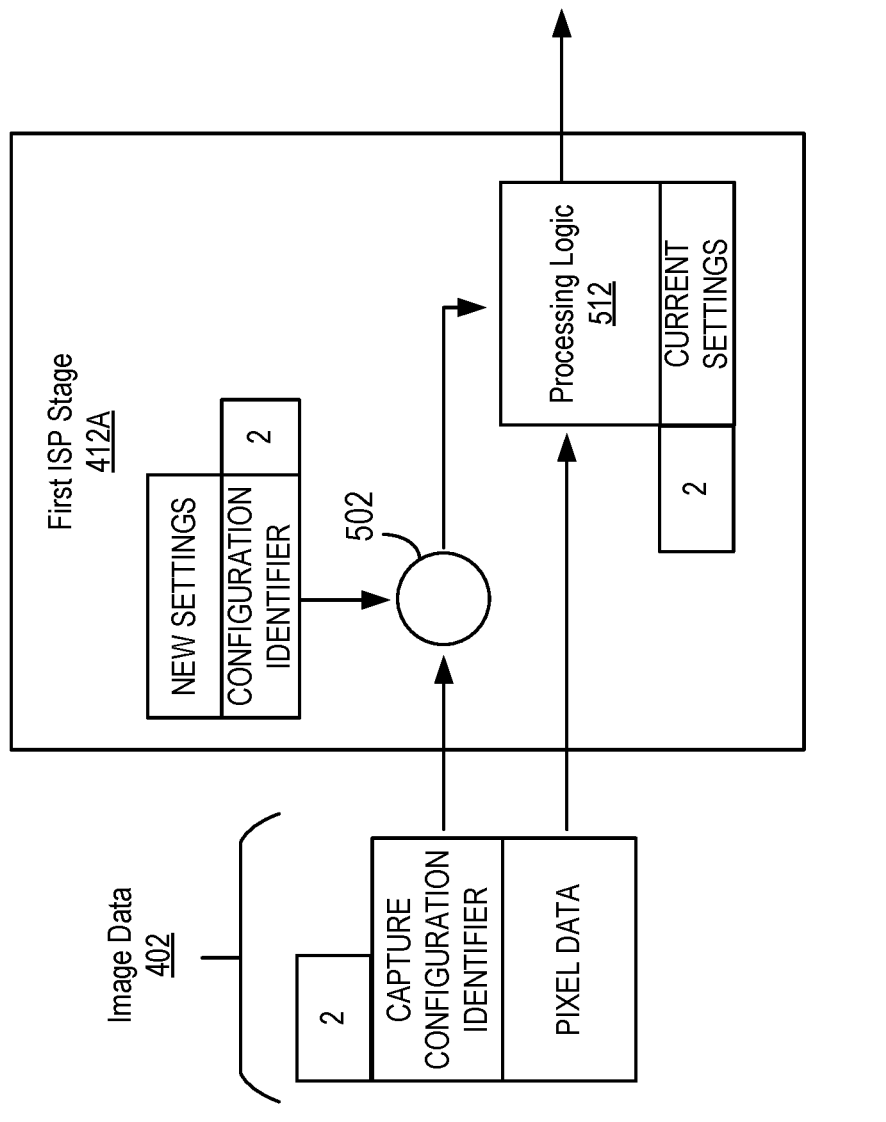
FIG. 5B is a block diagram of an image signal processor (ISP) stage reconfiguring to a second configuration according to some embodiments of the disclosure.

An example reconfiguration of an ISP stage is shown in FIG. 5A and FIG. 5B. FIG. 5A is a block diagram of an image signal processor (ISP) stage in a first configuration according to some embodiments of the disclosure. FIG. 5B is a block diagram of an image signal processor (ISP) stage reconfiguring to a second configuration according to some embodiments of the disclosure.

Referring to FIG. 5A, image data 402 with a capture configuration identifier of '1' is received at the first ISP stage 412A. Comparison logic 502 compares the input capture configuration identifier with a configuration identifier of '2' specifying new settings for the ISP stage 412A. There is no match, thus the current settings for image processing logic 512 of the first ISP stage 412A remain in the configuration identifier of '1' and the pixel data is processed accordingly and output to another downstream component (e.g., another ISP stage). This manner of operation improves resiliency of the image processing to corrupt data. For example, if a corrupt identifier is received in the image data 402, the current settings remain in operation in processing logic 512. When the data corruption is corrected, the capture configuration identifier is compared to the new configuration identifier and conditionally trigger the update of current settings for processing logic 512.

Referring to FIG. 5B, image data 402 with a capture configuration identifier of '2' is received at the first ISP stage 412A. Comparison logic 502 compares the input capture configuration identifier with a configuration identifier of '2' specifying new settings for the ISP stage 412A. There is a match, thus the new settings are programmed for the image processing logic 512. The pixel data is then processed according to the new settings associated with configuration identifier '2' and output to another downstream component (e.g., another ISP stage).

When the ISP stage is reconfigured according to the example of FIG. 5A and FIG. 5B, the processor may program the ISP and the image sensor with a new configuration without the complexity of synchronizing the setting change at the image sensor with the setting change at the ISP. Additionally, the likelihood of losing image frames due to incorrect processing is reduced because the synchronization is not necessary.

Figure 6:
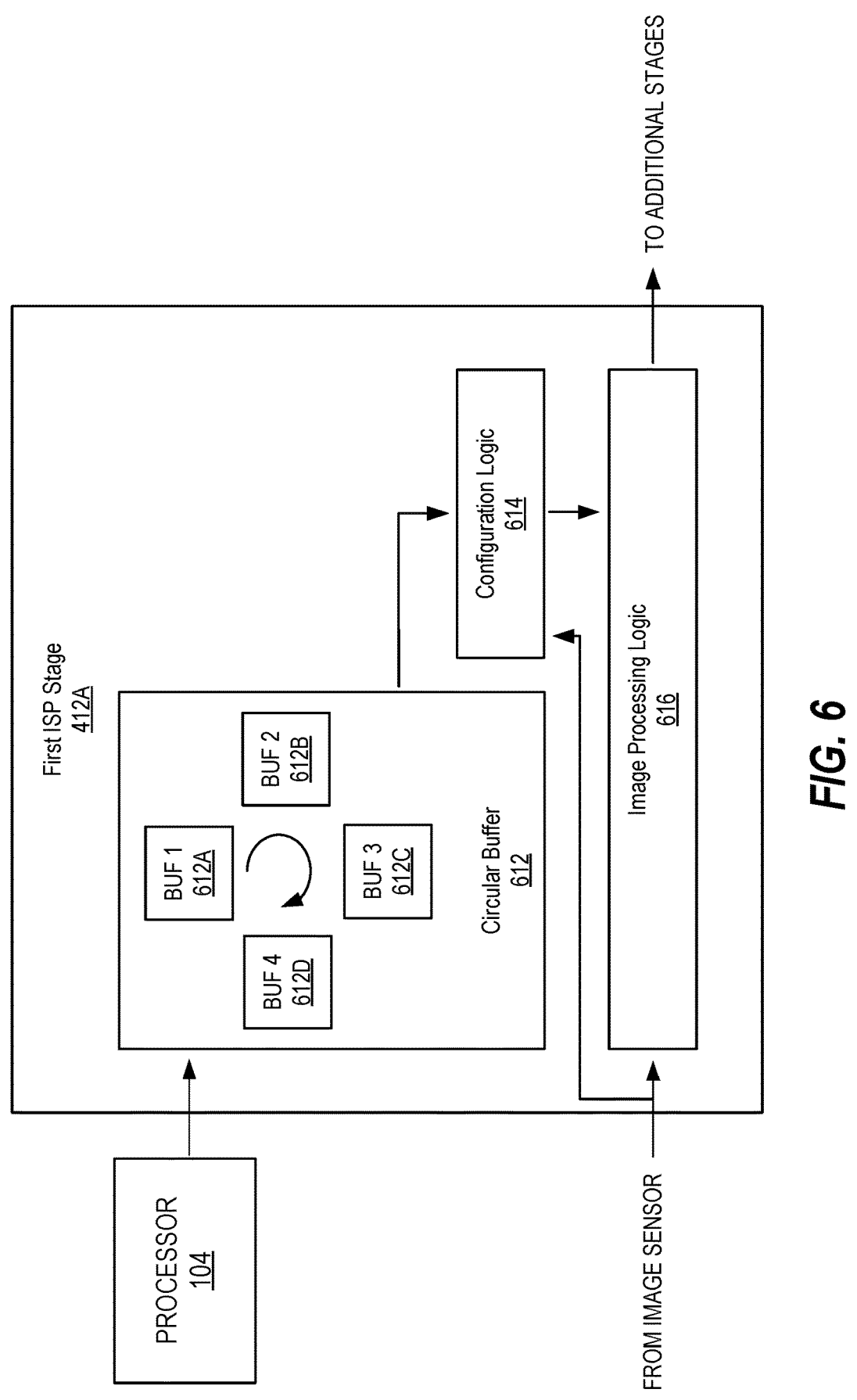
FIG. 6 is a block diagram of an image signal processor (ISP) stage with a circular buffer for storing configuration identifiers according to some embodiments of the disclosure.

In some embodiments, an ISP stage may be configured with a circular buffer to support the processing of a series of configuration changes. FIG. 6 is a block diagram of an image signal processor (ISP) stage with a circular buffer for storing configuration identifiers according to some embodiments of the disclosure. A processor 104 may write multiple configuration identifiers into the circular buffer 612. The circular buffer 612 may include several locations 612A-612D. Configuration logic 614 may compare a capture configuration identifier from image data with the current position of the circular buffer 612 to determine if a configuration update should be applied to image processing logic 616. In some embodiments, the configuration logic may compare the input image capture identifier with one location in the circular buffer 612 (in a first-in-first-out (FIFO) manner) or with all valid locations in the circular buffer 612. The circular buffer 612 supports the queueing of multiple configuration changes to facilitate rapid changes of the image sensor configuration that are faster than the processor can program into the ISP as individual changes.

One example operation for reconfiguring an image signal processor is described with reference to FIG. 7. FIG. 7 is a flow chart illustrating a method of reconfiguring an image signal processor (ISP) stage according to some embodiments of the disclosure.

At block 702, a first stage of an image signal processor receives a second configuration identifier for processing image data. That second configuration identifier is a next configuration identifier that is different from a first configuration identifier that is currently active.

At block 704, the first stage of the image signal processor receives image data from an image sensor, in which the image data comprises a first capture configuration identifier and pixel data captured with settings corresponding to the first capture configuration identifier.

At block 706, the first stage of the image signal processor determines a current set of parameters for processing the image data based on comparing the first capture configuration identifier with the second configuration identifier. The operation at block 706 may include the comparison and reconfiguration described with reference to FIG. 3 and FIG. 4 and illustrated in the example of FIG. 5A and FIG. 5B.

At block 708, the first stage of the image signal processor determines a first output image frame based on the image data by processing the pixel data according to the current set of parameters. When the image data includes a capture configuration identifier that matches the configuration identifier programmed in the ISP stage, the current set of parameters was updated to match the configuration used to capture the image data. When the image data includes a capture configuration identifier that does not match the configuration identifier programmed in the ISP stage, the current set of parameters used to process the image data is the same as the previous set of parameters.

The output of the first ISP stage may be provided to one or more additional ISP stages. The output of one stage may include the processed pixel data and the capture configuration identifier. The capture configuration identifier passes through the stages to update each stage as the image data is processed. Thus, the method 700 may be repeated for a second stage, a third stage, and additional stages. After one or more ISP stages process the image data, the output image frame may be stored, displayed, transmitted, or otherwise consumed by a user.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to receive and process image data from an image sensor. The apparatus is further configured to perform steps related to configuring stages of a processor, such as an image signal processor, to process the image data, with the configuration of individual stages being performed to match the configuration of received data as the data progresses through several stages of the image signal processor. For example, in the first aspect, the processor may be configured to perform operations including receiving, by a first stage of an image signal processor, a second configuration identifier for processing image data, that second configuration identifier being different from a first configuration identifier that is currently active; receiving, by the first stage of the image signal processor, image data comprising a first capture configuration identifier; determining, by the first stage of the image signal processor, a current set of parameters for processing the image data based on comparing the first capture configuration identifier with the second configuration identifier; and determining, by the first stage of the image signal processor, a first output image frame based on the image data by processing the image data according to the current set of parameters.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, receiving the first capture configuration identifier comprises receiving the first capture configuration identifier as associated with an image frame of the image data.

In a third aspect, in combination with one or more of the first aspect or the second aspect, determining the current set of parameters for processing the image data comprises: determining a previous set of parameters to be the current set of parameters when the first capture configuration identifier does not match with the second configuration identifier; and determining a new set of parameters to be the current set of parameters when the first capture configuration identifier matches with the second configuration identifier.

In a fourth aspect, in combination with one or more of the first aspect through the third aspect, the operations further include receiving, by a second stage of an image signal processor, the second configuration identifier for processing image data; receiving, by the second stage of the image signal processor, the first output image frame, and the first capture configuration identifier; determining, by the second stage of the image signal processor, a second current set of parameters for processing the first output image frame based on comparing the first capture configuration identifier with the second configuration identifier; and determining, by the second stage of the image signal processor, a second output image frame based on the first output image frame by processing the first output image frame according to the second current set of parameters.

In a fifth aspect, in combination with one or more of the first aspect through the fourth aspect, the operations further include storing, by the first stage of the image signal processor, a plurality of configuration identifiers in a circular buffer.

In a sixth aspect, in combination with one or more of the first aspect through the fifth aspect, the current set of parameters comprises auto exposure (AE) and auto white balance (AWB) settings.

In a seventh aspect, in combination with one or more of the first aspect through the sixth aspect, the first stage of the image signal processor receives the second configuration identifier from an application processor (AP) coupled to the image signal processor.

In an eighth aspect, in combination with one or more of the first aspect through the seventh aspect, the apparatus includes an image sensor.

In a ninth aspect, in combination with one or more of the first aspect through the eighth aspect, the processor is an image signal processor with ISP stages comprising at least one image front end and at least one image processing engine.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3 and 4 may be combined with one or more blocks (or operations) described with reference to another of the figures. For example, one or more blocks (or operations) of FIG. 3 may be combined with one or more blocks (or operations) of FIGS. 1-2. As another example, one or more blocks associated with FIG. 4 may be combined with one or more blocks (or operations) associated with FIGS. 1-2. As further examples, one or more blocks associated with FIG. 3, FIG. 4, FIG. 5A, FIG. 5B, FIG. 6, or FIG. 7 may be combined with one or more blocks (or operations) associated with another one of FIG. 3, FIG. 4, FIG. 5A, FIG. 5B, FIG. 6, or FIG. 7.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

receiving, by a first stage of an image signal processor, a second configuration identifier for processing image data, that second configuration identifier being different from a first configuration identifier that is currently active;

receiving, by the first stage of the image signal processor, image data comprising a first capture configuration identifier;

determining, by the first stage of the image signal processor, a current set of parameters for processing the image data based on comparing the first capture configuration identifier with the second configuration identifier, comprising:

determining a previous set of parameters to be the current set of parameters when the first capture configuration identifier does not match with the second configuration identifier; and determining a new set of parameters to be the current set of parameters when the first capture configuration identifier matches with the second configuration identifier; and determining, by the first stage of the image signal processor, a first output image frame based on the image data by processing the image data according to the current set of parameters.

2. The method of claim 1, wherein receiving the first capture configuration identifier comprises receiving the first capture configuration identifier as associated with an image frame of the image data.

3. The method of claim 1, further comprising storing, by the first stage of the image signal processor, a plurality of configuration identifiers in a circular buffer.

4. The method of claim 1, wherein the current set of parameters comprises auto exposure (AE) and auto white balance (AWB) settings.

5. The method of claim 1, wherein the first stage of the image signal processor receives the second configuration identifier from an application processor (AP) coupled to the image signal processor.

6. A method, comprising:

receiving, by a first stage of an image signal processor, a second configuration identifier for processing image data, that second configuration identifier being different from a first configuration identifier that is currently active;

receiving, by the first stage of the image signal processor, image data comprising a first capture configuration identifier;

determining, by the first stage of the image signal processor, a current set of parameters for processing the image data based on comparing the first capture configuration identifier with the second configuration identifier;

determining, by the first stage of the image signal processor, a first output image frame based on the image data by processing the image data according to the current set of parameters;

receiving, by a second stage of an image signal processor, the second configuration identifier for processing image data;

receiving, by the second stage of the image signal processor, the first output image frame, and the first capture configuration identifier;

determining, by the second stage of the image signal processor, a second current set of parameters for processing the first output image frame based on comparing the first capture configuration identifier with the second configuration identifier; and determining, by the second stage of the image signal processor, a second output image frame based on the first output image frame by processing the first output image frame according to the second current set of parameters.

7. An apparatus, comprising:
a memory storing processor-readable code; and
at least one processor coupled to the memory, the at least one processor configured to execute the processor-readable code to cause the at least one processor to perform operations including:
receiving, by a first stage of an image signal processor, a second configuration identifier for processing image data, that second configuration identifier being different from a first configuration identifier that is currently active;
receiving, by the first stage of the image signal processor, image data comprising a first capture configuration identifier;
determining, by the first stage of the image signal processor, a current set of parameters for processing the image data based on comparing the first capture configuration identifier with the second configuration identifier, the determining operation comprising:
determining a previous set of parameters to be the current set of parameters when the first capture configuration identifier does not match with the second configuration identifier; and
determining a new set of parameters to be the current set of parameters when the first capture configuration identifier matches with the second configuration identifier; and
determining, by the first stage of the image signal processor, a first output image frame based on the image data by processing the image data according to the current set of parameters.

8. The apparatus of claim 7, wherein receiving the first capture configuration identifier comprises receiving the first capture configuration identifier as associated with an image frame of the image data.

9. The apparatus of claim 7, wherein the at least one processor is further configured to perform steps comprising: storing, by the first stage of the image signal processor, a plurality of configuration identifiers in a circular buffer.

10. The apparatus of claim 7, wherein the current set of parameters comprises auto exposure (AE) and auto white balance (AWB) settings.

11. The apparatus of claim 7, wherein the first stage of the image signal processor receives the second configuration identifier from an application processor (AP) coupled to the image signal processor.

12. An apparatus, comprising:
a memory storing processor-readable code; and
at least one processor coupled to the memory, the at least one processor configured to execute the processor-readable code to cause the at least one processor to perform operations including:
receiving, by a first stage of an image signal processor, a second configuration identifier for processing image data, that second configuration identifier being different from a first configuration identifier that is currently active;
receiving, by the first stage of the image signal processor, image data comprising a first capture configuration identifier;
determining, by the first stage of the image signal processor, a current set of parameters for processing the image data based on comparing the first capture configuration identifier with the second configuration identifier; and
determining, by the first stage of the image signal processor, a first output image frame based on the image data by processing the image data according to the current set of parameters;
receiving, by a second stage of an image signal processor, the second configuration identifier for processing image data;
receiving, by the second stage of the image signal processor, the first output image frame, and the first capture configuration identifier;
determining, by the second stage of the image signal processor, a second current set of parameters for processing the first output image frame based on comparing the first capture configuration identifier with the second configuration identifier; and
determining, by the second stage of the image signal processor, a second output image frame based on the first output image frame by processing the first output image frame according to the second current set of parameters.

13. An image capture device, comprising:
an image sensor;
a memory; and
at least one image signal processor coupled to the memory and to the image sensor, the at least one image signal processor configured to perform steps comprising:
receiving, by a first stage of the at least one image signal processor, a second configuration identifier for processing image data, that second configuration identifier being different from a first configuration identifier that is currently active;
receiving, by the first stage of the at least one image signal processor, image data comprising a first capture configuration identifier;
determining, by the first stage of the at least one image signal processor, a current set of parameters for processing the image data based on comparing the first capture configuration identifier with the second configuration identifier, comprising:

determining a previous set of parameters to be the current set of parameters when the first capture configuration identifier does not match with the second configuration identifier; and determining a new set of parameters to be the current set of parameters when the first capture configuration identifier matches with the second configuration identifier; and determining, by the first stage of the at least one image signal processor, a first output image frame based on the image data by processing the image data according to the current set of parameters.

14. The image capture device of claim 13, wherein receiving the first capture configuration identifier comprises receiving the first capture configuration identifier as associated with an image frame of the image data.

15. The image capture device of claim 13, wherein the at least one image signal processor configured to perform steps comprising:

receiving, by a second stage of an image signal processor, the second configuration identifier for processing image data;

receiving, by the second stage of the image signal processor, the first output image frame, and the first capture configuration identifier;

determining, by the second stage of the image signal processor, a second current set of parameters for processing the first output image frame based on comparing the first capture configuration identifier with the second configuration identifier; and determining, by the second stage of the image signal processor, a second output image frame based on the first output image frame by processing the first output image frame according to the second current set of parameters.

16. The image capture device of claim 13, wherein the at least one image signal processor configured to perform steps comprising: storing, by the first stage of the image signal processor, a plurality of configuration identifiers in a circular buffer.

17. The image capture device of claim 13, wherein the current set of parameters comprises auto exposure (AE) and auto white balance (AWB) settings.

* * * * *